United States Patent [19]

Fiacco et al.

[11] Patent Number: 5,659,720
[45] Date of Patent: Aug. 19, 1997

[54] COMPUTER CONTROL DEVICE FOR MANAGING A TIMER ARRAY

[75] Inventors: Peter Fiacco, Yorba Linda; Vi Chau, Laguna Niguel; Jennifer Sullivan, Huntington Beach, all of Calif.

[73] Assignee: Emulex Corporatioln, Costa Mesa, Calif.

[21] Appl. No.: 429,916

[22] Filed: Apr. 27, 1995

[51] Int. Cl.$^6$ .................................................. G06F 1/14
[52] U.S. Cl. .................................................. 395/557
[58] Field of Search ........................................ 395/550

[56] References Cited

U.S. PATENT DOCUMENTS

| | | | |
|---|---|---|---|
| 4,969,092 | 11/1990 | Shorter | 364/DIG. 1 |
| 5,138,611 | 8/1992 | Cam et al. | 370/60 |
| 5,249,184 | 9/1993 | Woest et al. | 370/85.8 |
| 5,297,275 | 3/1994 | Thayer | 395/550 |

OTHER PUBLICATIONS

Krause, et al., "New Opportunities May Appear Amid System Vendor Buzzwords", Electronic News, Jan. 3, 1994, pp. 44 and 46.
Jeffery, Brian, "Where Does the RS/6000 Go Next?" Midrange Systems, Dec. 28, 1993, pp. 31-33.
"FCA Supports Advancing Technology for Gigabit Highway", Manufacturing Systems, Nov. 1993.
Mitchell, John, "Fiber Channel Technology Finds Acceptance", Workstation, Dec. 1993.
"Active Device Modules", Lasers & Optronics, Dec. 1993.
"1993 Technology Award Finalists", Fiberoptic Product News, Dec. 1993.
Goldberg, Dan, "Fibre Channel Brings the Unimaginable to Reality", Automatic I.D. New, Dec. 1993, pp. 48–49.
"IBM Microelectronics Optical Link Products", Fiberoptic Product News, Dec. 1993.
"The Furukawa Electric Co., Ltd. Affiliates", Fiberoptic Products News, Dec. 1993.
Fahey, Michael, "From Local to Global: Surveying the Fiber Landscape", Telecommunications, Nov. 1993, pp. 33–38.
Weber, Sam, "GaAs Making High–Speed Commercial Bid", Electronic Engineering Times, Dec. 13, 1993.
"The Standard in SCSI Tools", EDN Products Edition, Dec. 13, 1993.
Wirbel, Loring, "Networks Realign to Fit in", Electronic Engineering Times, Dec. 20, 1993, p. 51.
Roelandt, Wm. "The Triad of the Future", LAN Computing, Nov. 1993.
Meth, Clifford, "BiCMOS Serial Communications Chips Combine High Speed, Low Power", Dec. 2, 1993, p. 119.
Costlow, Terry, "FireWire: The Hot New Link?", Electronic Engineering Times, Dec. 20, 1993.
"High–Performance Integrated Circuits", EDN Products Edition, Dec. 13, 1993.
"Maximum Strategy's HIPPI–Based RAID Targets Workstations", Electroni News, Dec. 6, 1993.

*Primary Examiner*—Thomas M. Heckler
*Attorney, Agent, or Firm*—Fish & Richardson P.C.

[57] ABSTRACT

A method and apparatus for establishing a large number of EDTOV timers, each determining when an event has failed to occur on an exchange of a communications protocol. Values for each timer are maintained as a timer array. The entire timer array is read at regular scan intervals by a state machine and decremented by four associated hardware decrementers, four timers at one time. A Scan Interval variable determines the scan interval. The present invention is capable of scan intervals of up to 100 ns. Active time values are read, checked for zero, decremented preferably by one, and written back to the timer array. If a timer is detected as having timed out (equal to zero), then a value which identifies the exchange associated with that timer is logged into a time-out FIFO and "FF"h is written back into the timer. At the heart of the invention is the efficient use of dedicated hardware to decrement or otherwise alter the values of each timer as appropriate, and the use of a dedicated state machine to read values for each timer, provide the value to the hardware, and then load the new value of each timer back into memory.

19 Claims, 8 Drawing Sheets

FIG. 1

| WORD 511 (32BITS) | WORD 510 | WORD 509 | ... | WORD 2 | WORD 1 | WORD 0 |
|---|---|---|---|---|---|---|
| TIMER 2044 | TIMER 2040 | TIMER 2036 | ........ | TIMER 8 | TIMER 4 | TIMER 0 |
| TIMER 2045 | TIMER 2041 | TIMER 2037 | ........ | TIMER 9 | TIMER 5 | TIMER 1 |
| TIMER 2046 | TIMER 2042 | TIMER 2038 | ........ | TIMER 10 | TIMER 6 | TIMER 2 |
| TIMER 2047 (8BITS) | TIMER 2043 | TIMER 2039 | ........ | TIMER 11 | TIMER 7 | TIMER 3 |

COMPUTER CONTROL DEVICE FOR MANAGING A TIMER ARRAY

BACKGROUND OF THE INVENTION

1. Field of the Invention

This invention relates to computer timers, and more particularly to a computer controlled mechanism for managing a large number of devices that can measure elapsed time.

2. Description of Related Art

Timers are commonly used in the computer and communications arts to measure the duration in time between events or to indicate when a predetermined amount of time has expired. For example, timers allow a first device to wait a finite amount of time before taking action in response to a failure of a second device to respond as expected. The amount of time that a device waits for a response before considering the second device to have failed is referred to as an "Error Detect Time-Out Value" (EDTOV). In accordance with one common method for implementing a timer, a counter is loaded with a value and decremented at regular intervals by a clock signal. When the value of the counter reaches a predetermined value (such as zero), the timer has expired. This implementation requires that each timer that is concurrently running have a dedicated counter circuit capable of decrementing the value of the timer at each clock cycle.

An alternative method for implementing a timer in systems that have a programmable device (such as a microcontroller or microprocessor) is to have the programmable device load a value into a memory location. The programmable device is then interrupted at regular intervals (either by software instructions embedded in the code being executed or by an external interrupt clock). At each interrupt, the programmable device stops all other functions and decrements the value stored in the memory and checks whether the value is equal to a predetermined value (such as zero). When the value stored is equal to the predetermined value, then the timer has expired.

In some systems in which a great number of events must be timed concurrently, there is a need to maintain a great number of timers to detect the expiration of each EDTOV. Supporting a great number of hardware timers requires many hardware devices (i.e., counters), each of which is dedicated to maintaining and decrementing one EDTOV timer. Alternatively, supporting a great number of software timers requires a substantial amount of software overhead dedicated to decrementing, checking, and signaling the expiration, of each timer.

For example, in systems which communicate in accordance with the well known Fibre Channel protocol, a great number of timers (such as 2,048 8-bit timers) may be desired to be independently maintained at any one time to detect the expiration of an EDTOV related to each of 2,048 exchanges. An exchange is a bi-directional communications session between two devices over the Fibre Channel link. Each of the exchanges comprise a plurality of sequences. Each sequence is a uni-directional communications session comprising a plurality of frames. Frames of data are transmitted at up to 1 Giga-bit per second.

In accordance with the Fibre Channel protocol, action is required if an EDTOV timer associated with any one of the exchanges expires. Furthermore, in accordance with the Fibre Channel protocol, it is desirable for each timer to have a resolution of approximately 1 ms or less. Timers that meet the requirements of the Fibre Channel environment are difficult to implement due to the required resolution, the large number of timers that must be maintained concurrently, and the very fast transfer rate over a Fibre Channel link. Implementing 2,048 software timers at the resolution desired would overburden most controllers, leaving few resources available for any other control functions required to operate the communications link in accordance with the Fibre Channel protocol. Providing a dedicated RISC processor would increase the cost of a Fibre Channel protocol controller. Furthermore, in many cases, even a dedicated RISC processor would be unable to maintain 2,048 timers with a resolution of 1 ms.

For example, assume that 2048 timers must be concurrently managed with a resolution of 1 ms or less in a Fibre Channel system in which data is received at a rate of one word per 38 ns (i.e., 1 Giga-bit/sec.). The smallest Fibre Channel frames are 11 words. Accordingly, a frame may be received or transmitted every 418 ns. Every time a frame is transmitted, a timer must be started, and every time a frame is received a timer must be stopped. The timer accuracy must be maintained concurrently with starting and stopping of the timers. At a RISC processor clock rate of 50 MHz, a start timer operation requires 60 clocks cycles of the RISC processor per timer or 3.1 ms for the all 2048 timers to be started. Each stop timer operation requires 25 RISC processor cycles or 1.3 ms for all 2048 timers. In addition, each timer must be scanned, which requires 1.3 or 25 RISC processor cycles or 1.3 ms for all 2048 timers. It should be clear from these numbers that that firmware cannot manage 2048 timers (at least not at a clock rate of 50 MHz). For example, even if no clocks need to be started, but all 2048 clocks are being maintained, the RISC processor will only be able to update each timer at a rate of once per 3 ms. Since the desired resolution is 1 ms, the RISC must operate at a rate of at least 150 MHz just to maintain the 2048 timers. If the additional burden of starting timers is added, the RISC processor quickly becomes overwhelmed.

Implementing the timers in hardware would require a large number of transistors, and thus increase both the size and cost of the timer within a Fibre Channel interface device.

Accordingly, there is a need for a mechanism which allows a large number of EDTOV timers to be operated concurrently at relatively high resolution without implementing each timer in discrete hardware and without exhausting the processing bandwidth of the controllers which must manage the remainder of a communication protocol.

SUMMARY OF THE INVENTION

The present invention is a method and apparatus for establishing a large number of EDTOV timers, each determining when an event has occurred or failed to occur on an exchange of a communications protocol. In the context of the present invention, an exchange is a bi-directional communications session between two devices over the a communications link at very fast data rates (i.e., up to 1 Giga-bit per second). Each of the exchanges comprise a plurality of sequences. Each sequence is a uni-directional communications session comprising a plurality of frames. In accordance with one embodiment of the present invention, communications protocol timing requirements are monitored by a EDTOV engine. The EDTOV engine starts or stops a timer associated with each active exchange upon receipt of a command to a dedicated state machine within the EDTOV engine. In accordance with one embodiment of the present invention, the values for each compacted timer are maintained as a timer array in a selectable region of a frame buffer random access memory (RAM). The entire timer array is read at regular intervals by a state machine and decremented by four associated hardware decrementers, four timers at one time.

In accordance with the preferred embodiment of the present invention, a plurality of timers (four 8-bit timers, for example) are preferably packed into a single word (of 32 bits, for example) which is stored in the frame buffer RAM. Preferably, 512 words comprise a timer array of 2,048 timers. Timers are preferably read from the frame buffer RAM in blocks of four words under the control of a Direct Memory Access controller. The entire timer array is read (i.e., "scanned") in one scan interval. A scan clock preferably runs at a predetermined clock rate. A "Scan Interval" variable determines the scan interval, which is preferably a multiple of 1 ms. However, the present invention is capable of scan intervals of as small as 1 μs. All 2,048 timers in a timer array are preferably read, updated, and written back to the timer array in a single scan interval. Accordingly, the preferred embodiment of the present invention provides timers with a programmable resolution of as small as 1 μs.

Each timer associated with an exchange can be stopped or started by the state machine. The state machine starts a timer by directly writing a start value into a location in the timer array which is associated with the timer designated in the command. To stop a timer, the state machine directly writes a value of "FF"h into a location in the timer array which is associated with the timer designated in the command. If a timer is inactive, then a value of "FF"h hexadecimal ("FF"h) resides in the timer memory location. The state machine stops a timer by writing a value of "FF"h into the timer array.

The state machine scans the timer array once every scan interval. Active timer values are read, checked for zero, decremented preferably by one, and written back to the timer array. If a timer is detected as having timed out (equal to zero), then a value which identifies the exchange associated with that timer is logged into a time-out FIFO and "FF"h is written back into the timer. The FIFO may be read by external processing devices (such as the protocol processor) to determine whether a protocol error has occurred, and on which exchange the error occurred.

At the heart of the invention is the efficient use of dedicated hardware to decrement or otherwise alter the values of each timer as appropriate, and the use of a dedicated state machine to read values for each timer, provide the value to the hardware, and then load the new value of each timer back into memory.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 3A–FIG. 3K are illustrations of the state machine registers of the preferred embodiment of the present invention.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 1:
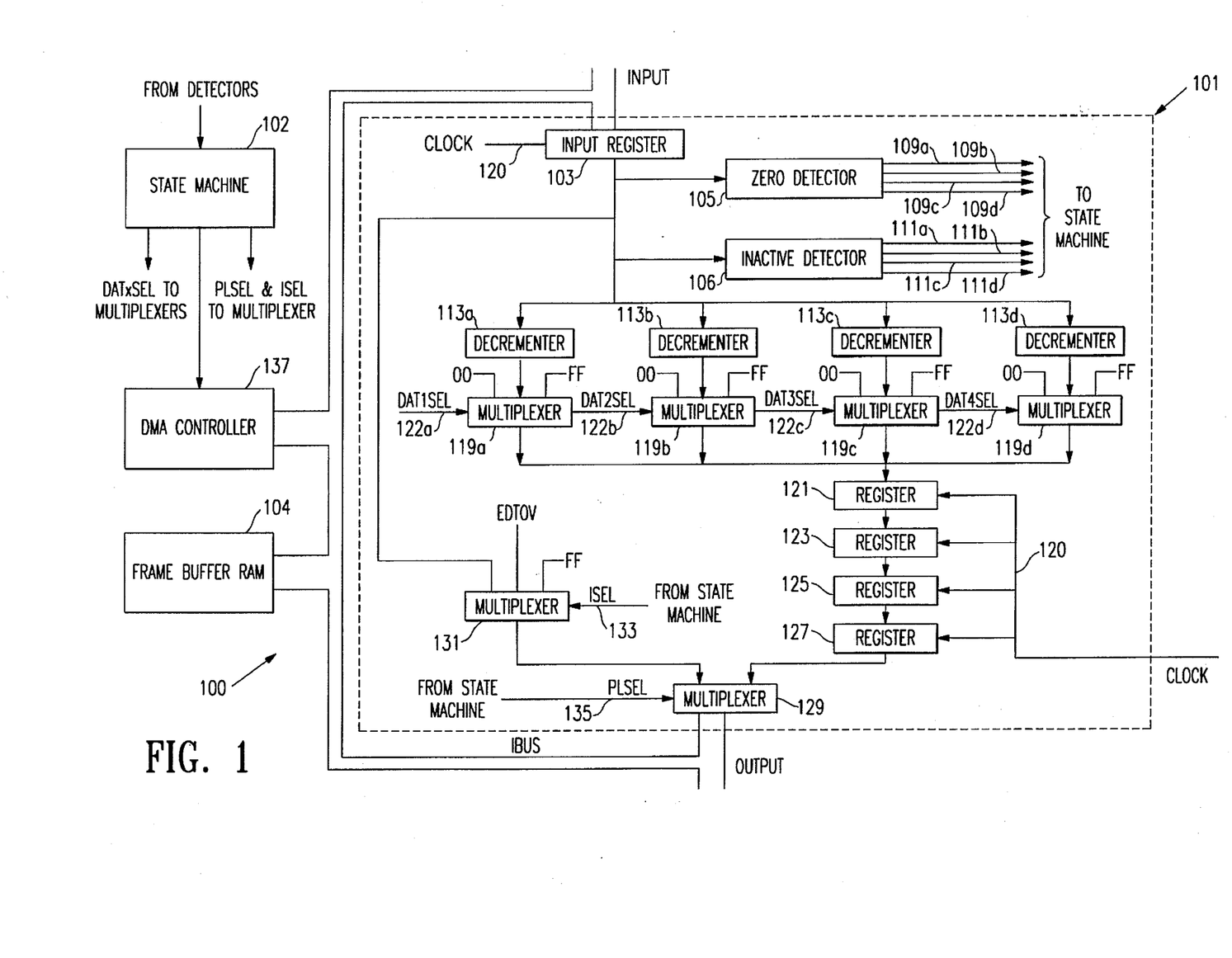
FIG. 1 is block diagram of the EDTOV engine hardware in accordance with the present invention.

The present invention is a fast and efficient method and apparatus for maintaining a plurality of error detect time-out value ("EDTOV") timers to indicate when a selectable duration of time has elapsed after the occurrence of a first event and before the occurrence of a second event in a fast communications link, such as Fibre Channel. In accordance with one embodiment of the present invention, 2,048 timers may be maintained concurrently. Each timer is updated by a read-modify-write cycle ("scan cycle") at a selectable scan interval. The scan interval may be as short as 1 μs. However, in the preferred embodiment of the present invention, the scan interval is a multiple of 1 ms. The shorter the scan interval, the greater the resolution, but the more bus bandwidth the invention requires. Therefore, in the preferred embodiment, a scan interval is approximately 1 ms or any multiple thereof, depending upon the value stored in the scan interval register. The heart of the present invention is an EDTOV engine. One embodiment of the EDTOV engine 100 in accordance with the present invention is shown in FIG. 1. Preferably, the EDTOV engine 100 comprises a decrementer circuit 101 and a finite state machine 102 which controls the operation of the decrementer circuit 101.

Figure 2:
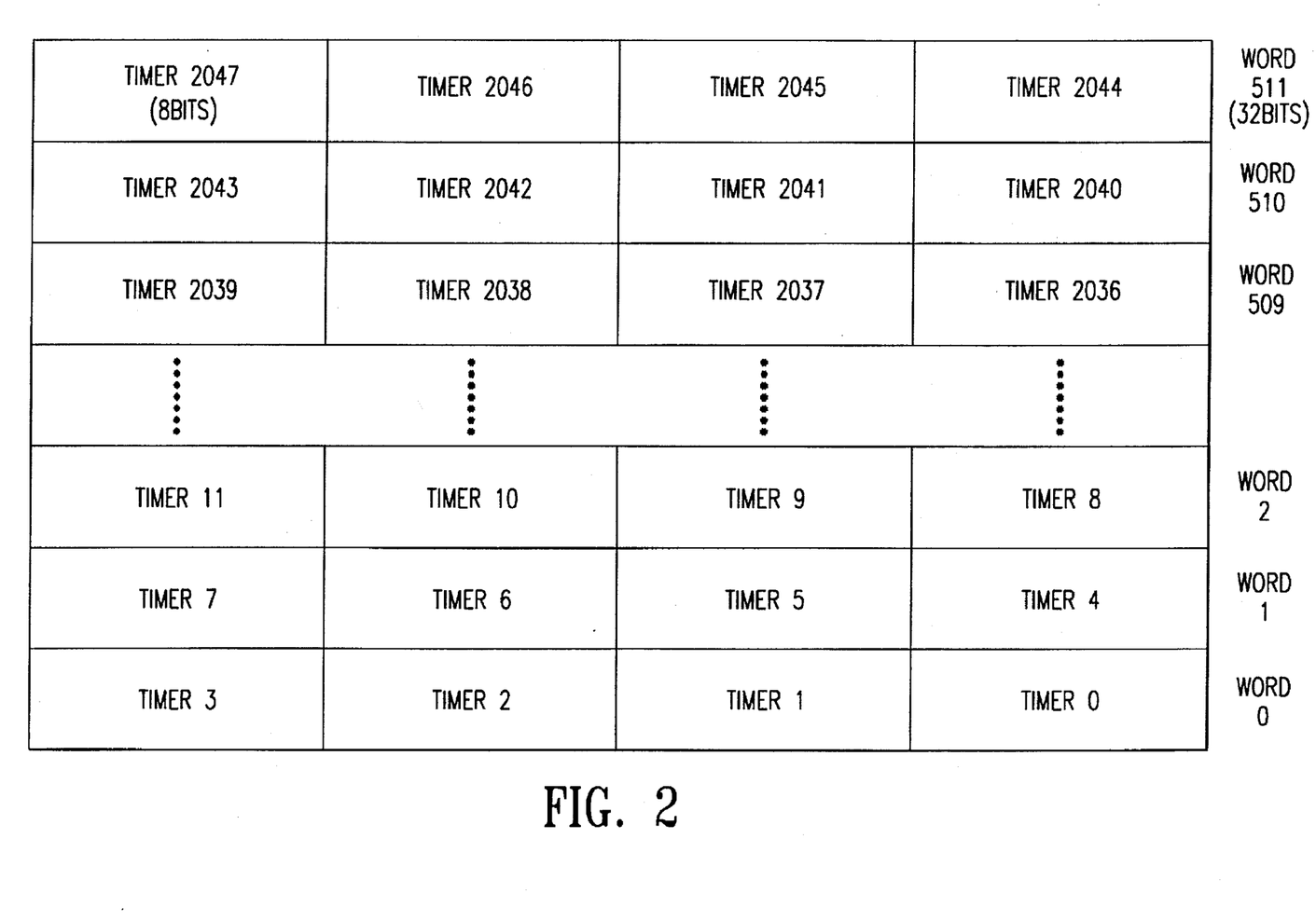
FIG. 2 is an illustration of the organization of timer values in a timer array in accordance with the present invention.

In the preferred embodiment of the present invention, timer values are configured as a timer array within a frame buffer random access memory (RAM) 104. The frame buffer RAM 104 is preferably the same buffer used to temporarily store packets of data received in each frame of information. FIG. 2 is an illustration of the organization of timer values 201 in a timer array 200 in accordance with the present invention. Each timer value 201 is preferably represented in eight bits. In the preferred embodiment, data is transferred as 32-bit words. Therefore, for the sake of efficiency, timer values 201 are also stored in the timer array 200 as 32-bit words. Each 32-bit word in the timer array 200 represents four timer values 201.

The state machine 102 is capable of writing values directly into the timer array 200. Commands from an external processing device (such as a protocol processor) to start or stop a timer are preferably provided to the state machine 102 through one of three command registers. Command registers are described in greater detail below. The state machine writes a "FF" hexadecimal "FF"h) into eight bits of a location in the timer array 200 to stop a timer, and writes a value from "01"h to "FE"h to the timer array in order to start a timer. The particular value written to a timer value 201 to start a timer is determined by a value stored in an EDTOV configuration register. Each of the configuration registers of the preferred embodiment of the present invention are described in greater detail below.

The state machine reads each timer value 201 from the timer array 200 once per scan interval. The timer values 201 are preferably read from the timer array 200 in a Direct Memory Access (DMA) operation of four word blocks. In order to implement the present read-modify-write cycle at the speed required, the present invention preferably operates without the aid of a programmed control device. Rather, in the preferred embodiment of the present invention, the state machine 102 sets the control inputs to each of the components in the decrementer 101 and allows four timers to be processed at the speed of the propagation delays through the gates of each component. A clock synchronizes the operation of the decrementer circuit 101. Accordingly, since the state machine 102 controls the reading and writing of timer values 201 to and from the timer array 200, the present invention achieves the benefit of a software timer (i.e., requires minimal hardware). In addition, since decrementer circuit 101 of the present invention processes the values read from the timer array 200, the present invention achieves the benefit of a hardware timer (i.e., does not require excessive processor bandwidth and operates at high speed).

Decrementer Architecture

Referring to FIG. 1, an input register 103 is provided to receive each word (four timer values 201) read from the timer array 200. A word is applied to the input of the input register 103 and loaded upon the first clock after the state machine 102 asserts a load signal on the load signal line 107. A time-out detect circuit 105 and an inactive detect circuit 106 determine whether each timer value 201 loaded into the input register 103 has a hexadecimal value of either "00" or "FF"h. In accordance with one embodiment of the present invention, if the timer value 201 is a "00" then the timer has expired (i.e., "timed-out"). If a timer has expired, then an indication of the expiration is coupled to the state machine 102 on a time-out detect signal line 109a–109d. Each time-out detect signal line 109a–109d that is asserted will indicate that an associated timer has expired. For example, if the time-out detect signal line 109a is asserted, then the first timer value (i.e., the first eight bits) of the value loaded into the input register is all zero. Accordingly, the first of the four timers has timed out. Preferably, if the time-out detect signal line 109b is asserted, then second timer value (i.e., the second eight bits) of the value loaded into the input register 103 is zero and the second timer has timed out, etc.

Likewise, the value "FF"h is used in the preferred embodiment to represent an inactive timer. Therefore, when any of the timer values loaded into the input register 103 is "FF"h the corresponding output line 111a–111d indicates which timer is inactive. The output 109a–109d, 111a–111d of both the time-out detect and inactive detect circuits 105, 106 are globally coupled to the state machine 102. The output of the input register 103 is coupled to the input to each of four decrementers 113a–113d. Each decrementer 113a–113d is associated with one of the four timer values 201 in the input register 103. Each timer value 201 is decremented by the associated decrementer 113a–113d. The output of the decrementer 113a–113d is coupled to the input to a multiplexer 119a–119d.

The state machine 102 controls select lines DAT1SEL, DAT2SEL, DAT3SEL, and DAT4SEL signals (collectively referred to as DATXSEL) 122a–122d to the multiplexer 119a–119d to output either a value of "FF"h, a value of "00" or the decremented value coupled to the multiplexer 119a–119d from the decrementer 113a–13d. The outputs from all four multiplexers 119a–119d are loaded into a first level output register 121 upon a next clock signal. The output of the first level output register 121 is coupled to the input to a second level output register 123 upon a third clock signal. The output from the second level output register 123 is coupled to the input to a third level output register 125 upon a fourth clock signal. The output of the third level output register 125 is coupled to a fourth level output register 127 upon a fifth clock signal. Accordingly, as a next word is loaded into the input register 103, the output of each multiplexer 119a–119d is loaded into the first level output register 121, and the output of the lower three level output registers 121, 123, 125 are loaded into the input of the next level output register, 123, 125, 127, respectively. The output of the fourth level output register is coupled to a first input of an output multiplexer 129. Accordingly, the operation of the decrementer circuit 101 is "pipelined".

A second input to the output multiplexer 129 is coupled to a load multiplexer 131. A first input to the load multiplexer 131 is coupled to the output of the input register 103. A second input to the load multiplexer 131 is coupled to an EDTOV register which holds a start value that is loaded into each timer upon starting the timer. The output from the load multiplexer 131 is preferably 32 bits wide. The third input to the load multiplexer 131 is preferably hardwired to "FF"h. A 3-bit load select (ISEL) signal coupled on a load select signal line 133 is coupled from the state machine 102 to the load multiplexer 131. The ISEL signal determines which timer value from among the four timer values output by the output multiplexer 129 will be loaded, and whether the value loaded will be "FF"h or the EDTOV value. Accordingly, the state machine 102 controls the load multiplexer 131 to determine whether a start value from the EDTOV register or "FF"h is to be loaded into a selected timer memory location within the timer array. A pipeline select signal (PLSEL) coupled from the state machine 102 to the output multiplexer 129 on a PLSEL signal line 135 determines whether the output from the load multiplexer 131 or the output from the fourth level output register 127 is to be loaded into each word of the timer array 200. The operation of the decrementer will be discussed in detail below.

State Machine Registers

The state machine 102 of the present invention preferably has eleven registers: three command registers, four status registers, and four configuration registers. Each of the registers is illustrated in FIGS. 3A–3K. Each of the configuration registers are preferably loaded with an initial value by an external processing device (such as a protocol processor) upon initialization of the EDTOV engine 100.

Figure 3A:
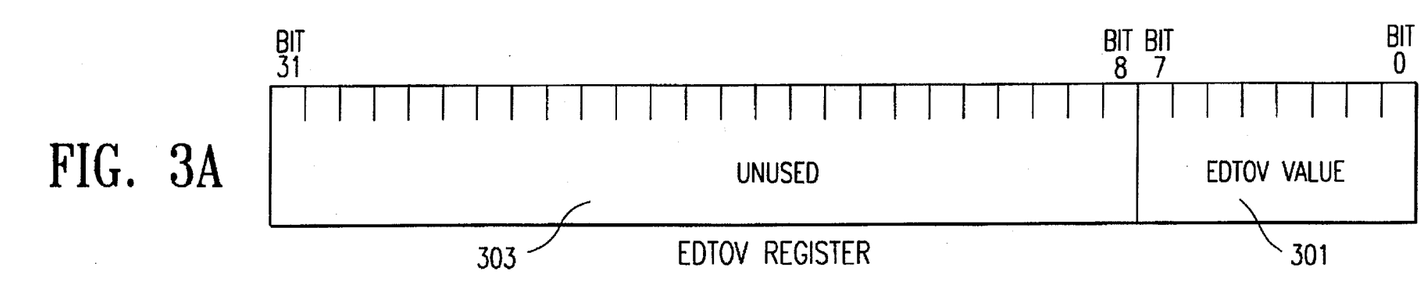

The EDTOV register, shown in FIG. 3A, is the first configuration register in the preferred embodiment of the present invention. The least significant 8-bits (i.e., the "EDTOV" field) 301 of the EDTOV register are loaded with the initial value to be loaded into each timer upon starting the timer. The most significant 24 bits 303 are preferably unused. Each timer is loaded with the same timer value when started, unless an external processing device changes the value stored in the EDTOV field 301.

Figure 3B:
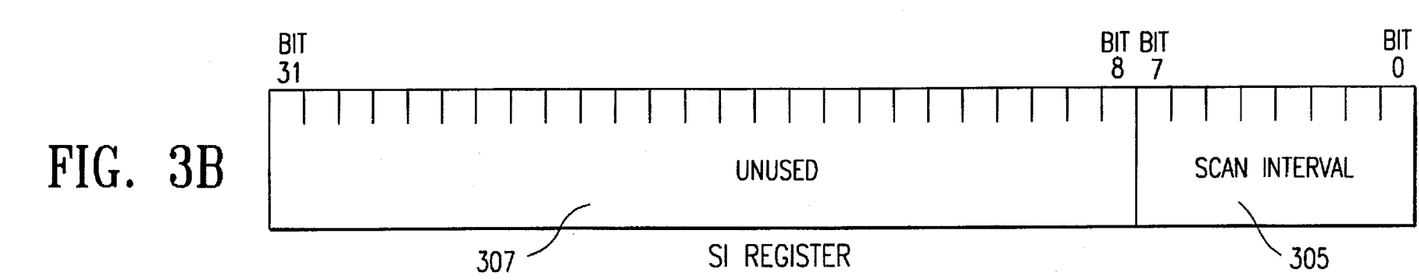

The Scan Interval (SI) register, shown in FIG. 3B, is the second configuration register in the preferred embodiment of the present invention. A Scan Interval field 305 of the SI register is loaded with a value that determines the scan interval of the present invention. In the preferred embodiment of the present invention, the scan interval is equal to one millisecond times the value stored in the Scan Interval field 305. The Scan Interval field 305 comprises the eight least significant bits of the register. Therefore, if the value stored in the Scan Interval field 305 is equal to "0011 0001", then the scan interval is 49 ms (i.e., each of the timers in the timer array 200 will be updated once per 49 ms). A value of zero is preferably not permissible in the Scan Interval field 305. The most significant 24 bits 307 of the SI register are preferably not used.

Figure 3C:
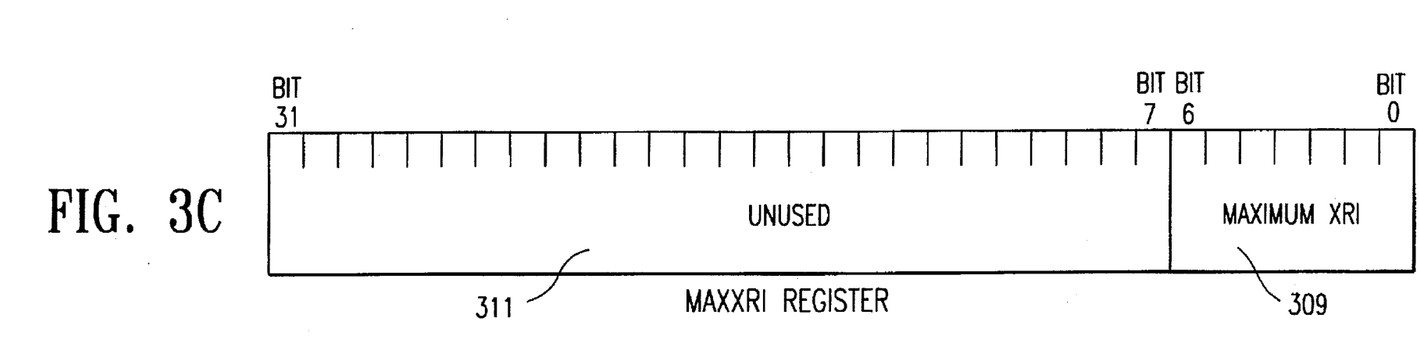

A Maximum exchange reference index (MAXXRI) register, shown in FIG. 3C, is the third configuration register in the preferred embodiment of the present invention. The MAXXRI register includes a Maximum XRI field 309 comprised of the seven least significant bits of the register. The most significant 25 bits 311 are preferably unused. The Maximum XRI field 309 holds a value that indicates how many timers are to be included in the timer array 200. Since timers are stored four per word in the timer array 200, each increment of the Maximum XRI field 309 represents four timers. Since in the preferred embodiment of the present invention the maximum number of timers is 2,048, the Maximum XPI field 309 can have a value that is in the range of 0–127. Accordingly, by loading the Maximum XRI field 309 of the MAXXRI register with a value of "000111" would result in the state machine 102 reading only the first seven words from the timer array 200 each scan interval.

Figure 3D:
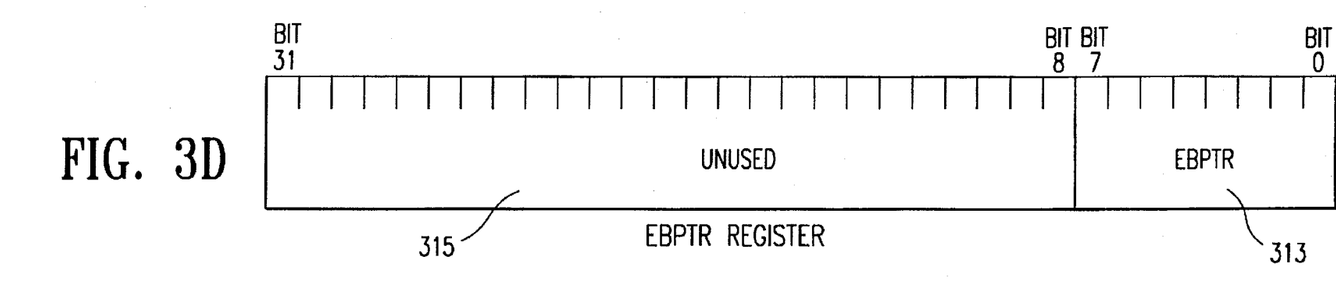

An EDTOV buffer RAM base address pointer (EBPTR) register, shown in FIG. 3D is the fourth configuration register in the preferred embodiment of the present invention. An 8-bit EBPTR field 313 within the EBPTR register identifies the relative location of the timer array 200 within the frame buffer RAM 104. The most significant 24 bits 315 are preferably unused. The timer array 200 may be placed in any one of 256 frame buffers. Each frame buffer is 512 words long within the frame buffer RAM 104. In the preferred embodiment of the present invention, the 256 frame buffers are divided into four blocks of 64 frame buffers for convenience when using 32K×36 bit SRAM (static random access memory) integrated circuit chips. In the preferred embodiment of the present invention, the default value for the EBPTR field 313 is "1", which causes the timer array 200 to reside at the bottom of the second block of frame buffers in the frame buffer RAM 104.

Figure 3E:
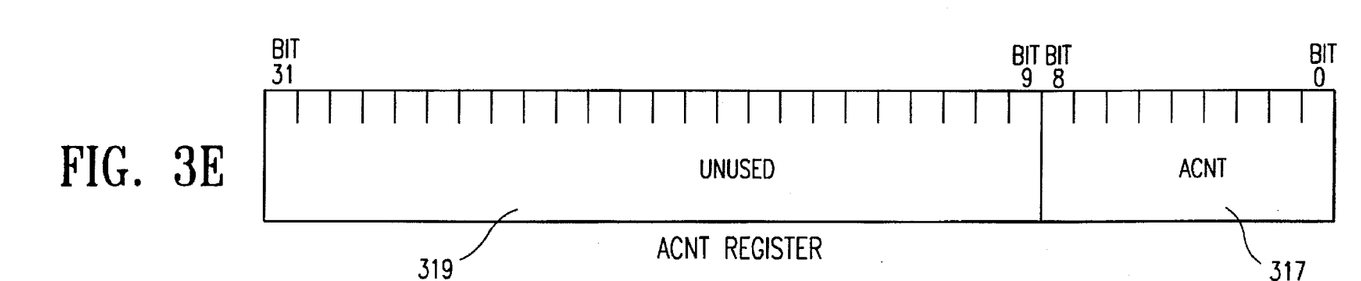

An EDTOV scan address counter (ACNT) register, shown in FIG. 3E, is the first status register in the preferred embodiment of the present invention. An ACNT field 317 which comprises the least significant nine bits indicates which word of the timer array 200 is currently being processed by the decrementer circuit 101. The most significant 23 bits 319 are preferably unused. The ACNT register is dynamically controlled by the state machine 102. That is, each time the state machine 102 processes a timer value 201, the state machine increments the value in the ACNT field 317.

Figure 3F:
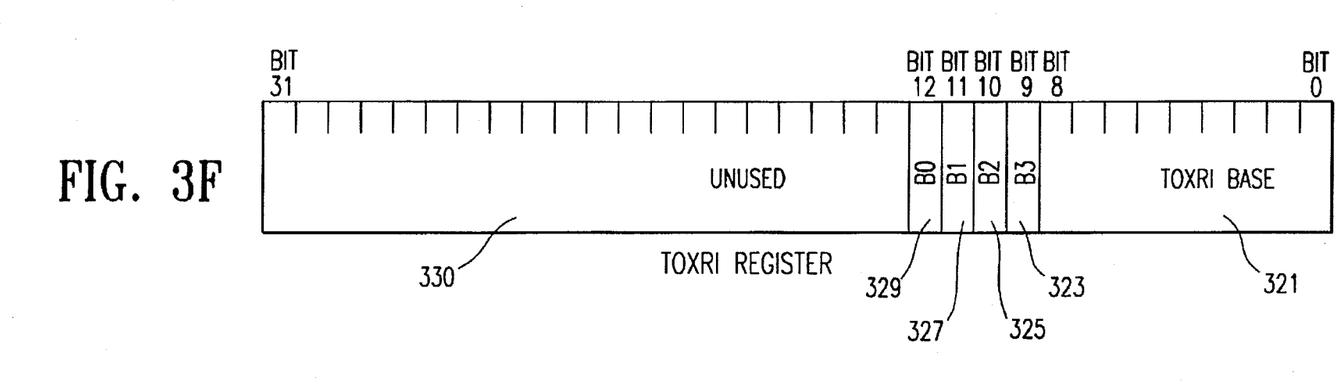

An EDTOV Time-out (TOXRI) FIFO register, shown in FIG. 3F, is the second status register in the preferred embodiment of the present invention. The TOXRI FIFO register is a four word deep conventional FIFO. Each word maintains the status of four timers having addresses that begin at a base TOXRI address held in a TOXRI base field 321. The TOXRI base field 321 preferably comprises the least significant nine bits of each word of the TOXRI FIFO register. The next most significant bit 323 preferably indicates whether the timer at an address offset by three from the base address has expired. The next most significant bit 325 preferably indicates whether the timer at an address offset by two has expired. Likewise, bits 327, 329 preferably indicate whether the timers at an address offset by one and at the base address, respectively, have expired. The most significant 19 bits are preferably unused.

Figure 3G:
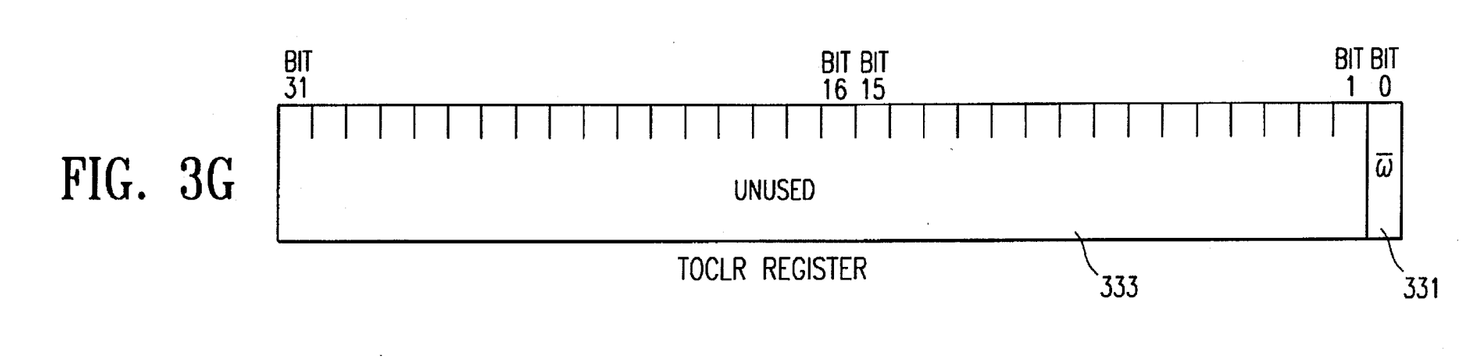

An EDTOV Time-out Interrupt Clear (TOCLR) register, shown in FIG. 3G, is the third status register in the preferred embodiment of the present invention. The least significant bit of the TOCLR register comprises an EDTOV Interrupt (EI) field 331. When the bit of the EI field 331 is set, then an interrupt from the EDTOV engine is pending to an external processing device. The 31 most significant bits 333 are preferably not used.

Figure 3H:
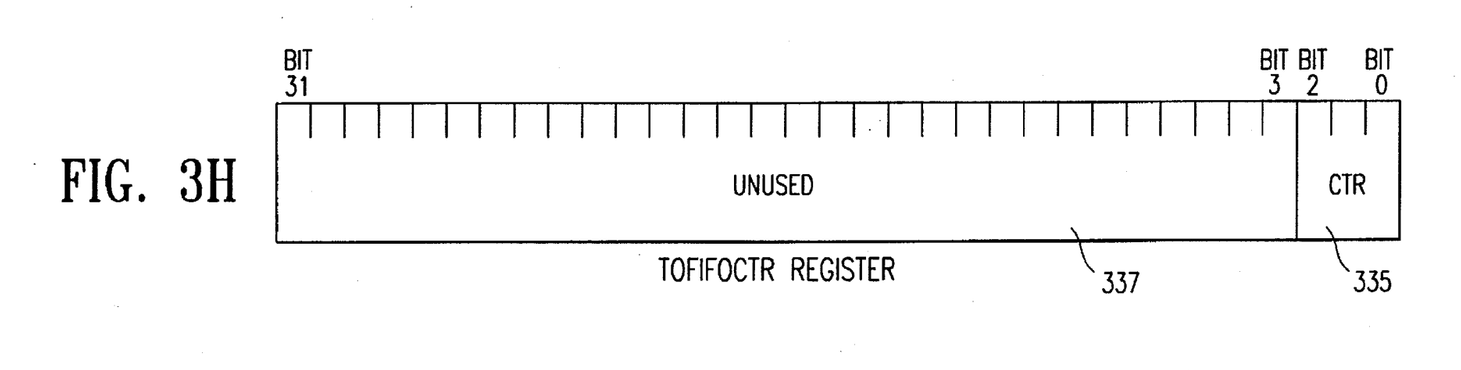

An EDTOV Time-out FIFO Counter (TOFIFOCTR), shown in FIG. 3H is the fourth status register in the preferred embodiment of the present invention. The TOFIFOCTR has a CTR field 335 which indicates the number of expired FIFO entries in the TOXRI FIFO register at the time an interrupt is set by the state machine 102 (i.e., when a zero is detected by the decrementer circuit 101, as will be discussed below). The 29 most significant bits 337 are preferably not used.

Figure 3I:
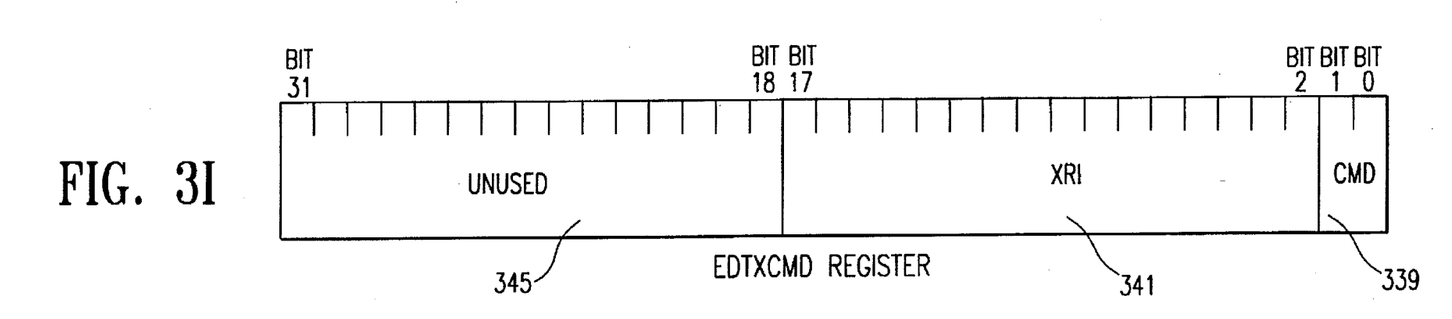

A Transmit Engine EDTOV Timer Command (EDTXCMD) register, shown in FIG. 3I, is the first command register in the preferred embodiment of the present invention. A command (CMD) field 339 can be loaded to command the state machine 102 to start a timer or stop a timer. The CMD field 339 can also be loaded with a "no operation" command. In addition, a 16-bit XRI field 341 is loaded with the address of the timer that is to be effected by the command. The 14 most significant bits 345 are preferably not used.

Figure 3J:
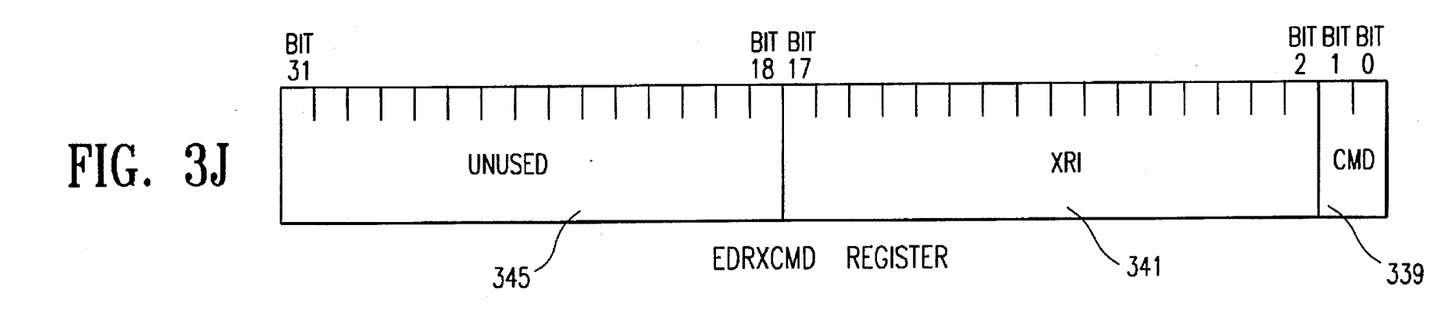

A Receiver Engine EDTOV timer Command (EDRXCMD) register, shown in FIG. 3J, is the second command register in the preferred embodiment of the present invention. The EDRXCMD register is essentially identical to the EDTXCMD register. However, in the preferred embodiment of the present invention, commands to the state machine 102 from an external receiver engine are written to the EDRXCMD register, and commands to the state machine 102 from the transmit engine are written to the EDTXCMD register.

Figure 3K:
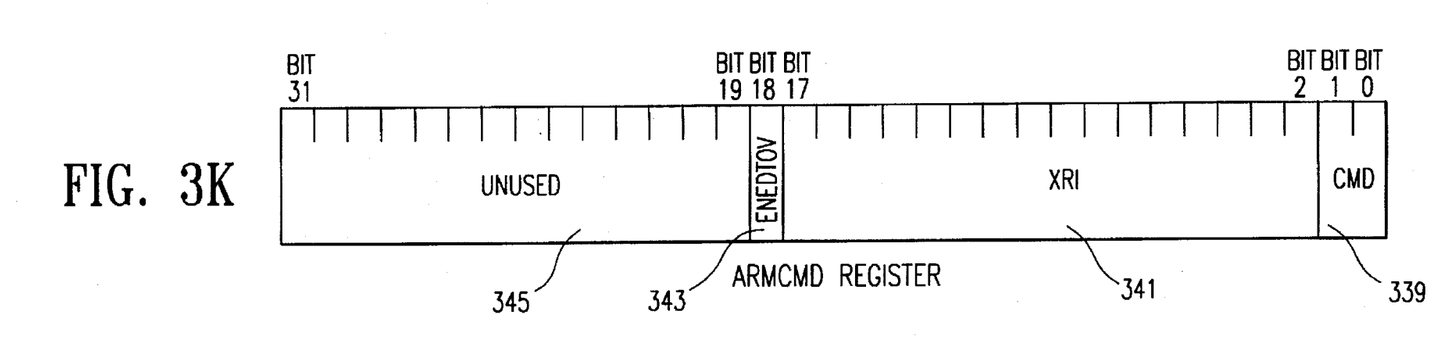

A EDTOV Timer Command register (ARMCMD) register, shown in FIG. 3K, is the third command register in the preferred embodiment of the present invention. The ARMCMD register has a command (CMD) field 339 and an XRI field 341. The CMD field 339 and the XRI field 341 are preferably identical to the CMD field 339 and the XRI field 341 of the other two command registers. In addition, the ARMCMD register preferably has a 1-bit ENEDTOV field 343. The ENEDTOV field 343 enables or disables the EDTOV engine 100, depending upon the state of the ENEDTOV field 343.

State Machine/Decrementer Circuit Operation

Figure 4:
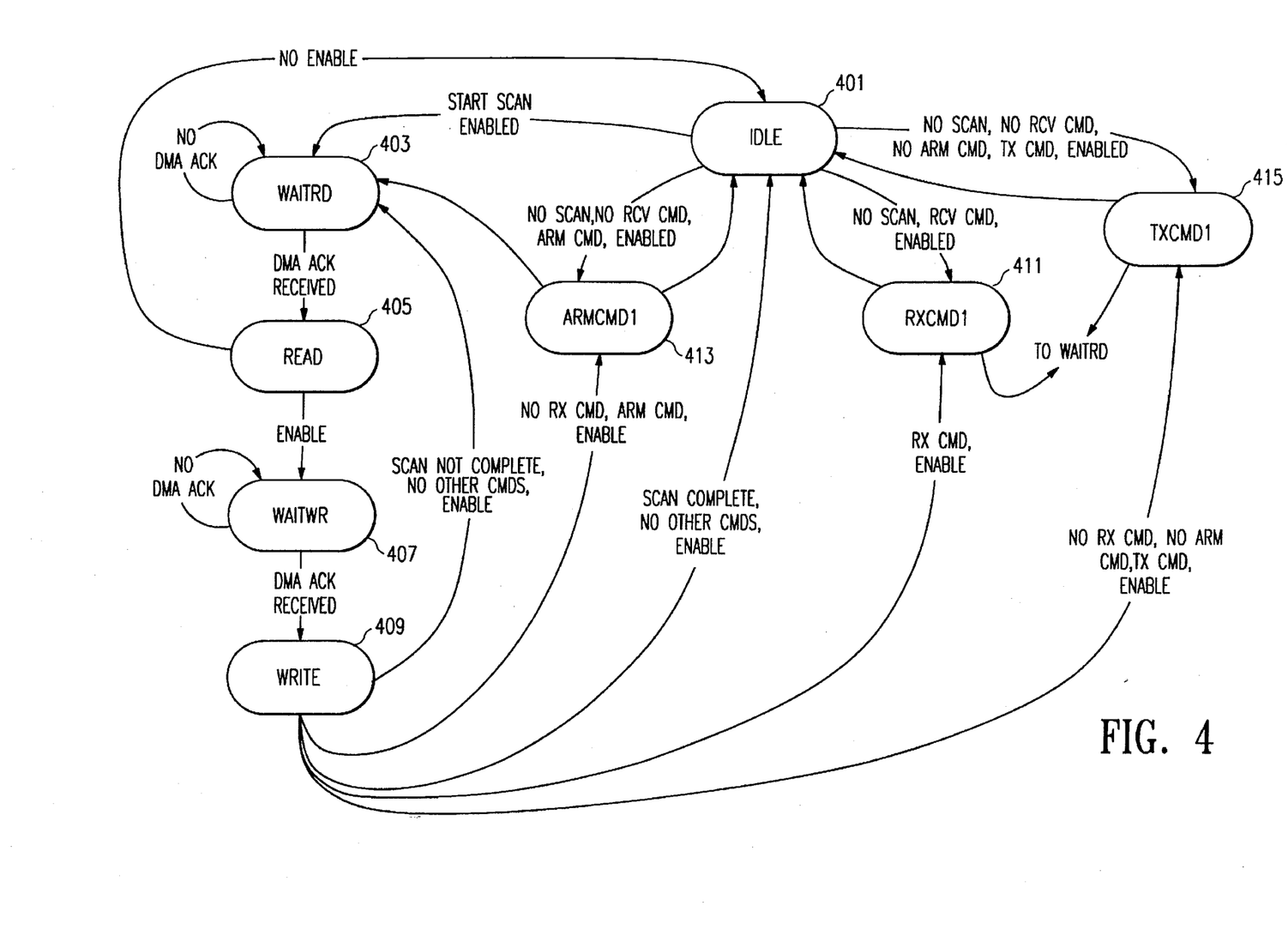
FIG. 4 is a state diagram which illustrates the operation of the state machine in accordance with the preferred embodiment of the present invention.

FIG. 4 is a state diagram which illustrates the operation of the state machine 102. In accordance with the preferred embodiment of the present invention, the state machine moves from state to state and values are loaded into the registers 103, 121, 123, 125, 127 on each positive edge of the MS clock. Starting at the IDLE state 401, the next state of the state machine 102 is determined by the status of five conditions. The first condition (start scan) is determined by a scan bit coupled to the state machine 102 as an input. The scan bit is set upon expiration of the scan interval. The second condition (enable) is determined by an enable bit 343 coupled to the state machine 102 as an input. The enable bit 343 resides in the ARMCMD register and is set to indicate that the EDTOV engine is enabled. The third condition (receive engine command) is determined by the state of the two least significant bits (i.e., the CMD field 339) of the EDRXCMD register. The fourth condition (transmitter engine command) is determined by the state of the two least significant bits (i.e., the CMD field 339) of the EDTXCMD register. The fifth condition (arm command) is determined by the state of the two least significant bits (i.e., the CMD field 339) of the ARMCMD register.

Figure 5:
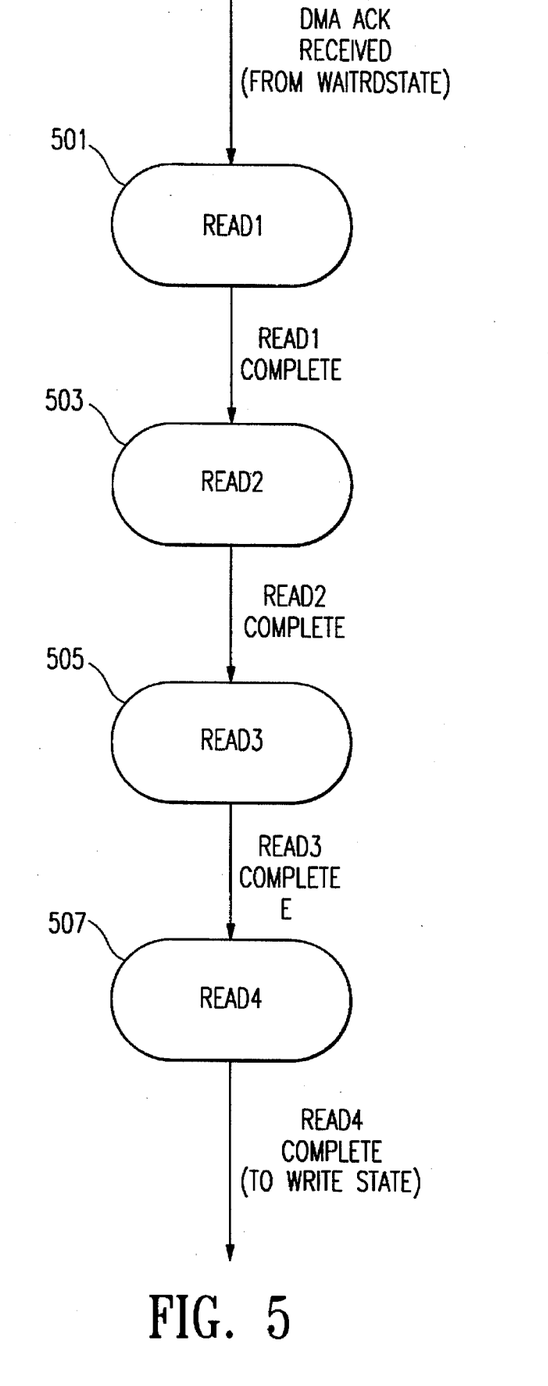
FIG. 5 is a more detailed state diagram of the READ state in accordance with the preferred embodiment of the present invention.

If the enable bit 343 and the scan bit are both set, then the state machine 102 enters WAITRD state 403 from idle state 401 regardless of the status of the other conditions. In WAITRD state 403, the state machine 102 requests a four word Direct Memory Access (DMA) read operation of an external DMA controller 137. The four words to be returned by the DMA controller is addressed by the values in the ACNT register and the EBPTK register. The state machine 102 then awaits return of a DMA acknowledge signal from the DMA controller 137. Upon assertion of the DMA acknowledge signal, the state machine 102 enters READ state 405. FIG. 5 is a more detailed state diagram of the READ state 405. In READ1 state 501, the input register 103 is enabled to load the first word returned by the DMA controller.

Once the input register 103 is loaded with a current word, the time-out detect circuit 105 and the inactive detect circuit 106 determine whether each timer of the current word is a hexadecimal value "00" or "FF"h. An indication as to whether any of the four timers within the current word are equal to zero is then coupled from the time-out detect and inactive detect circuits 106, 105 to the state machine 102 on signal lines 109a–109d. Each time-out detect signal line 109a–109d that is asserted will indicate that an associated timer has expired. If the value of any one of the timer values in the input register 103 is "FF"h, then the appropriate output line 111a–111d is asserted to indicate that the associated timer is inactive.

The state machine 102 then enters READ2 state 503. In READ2 state 503, the state machine 102 loads the first word and awaits receipt of the second word (second four timers) from the DMA controller 137. Upon successfully loading the first word into the input register 103, the states of the outputs from time-out detect and inactive detect circuits 106, 105 are determined by the value of the first four timer values. Each of the timers in the first word in the input register 103 are coupled to the associated decrementers 113a–113d. The state machine 102 enables the value stored in the ACNT register to be incremented to point to the next word on the next positive edge of the MS clock. A TOFULL signal and a TOEMPTY signal are coupled from the TOXRI FIFO register to the state machine 102 to indicate the status of the TOXRI FIFO register.

In READ2 state 503, if the TOXRI FIFO register is not full, then DATXSEL output signals from the state machine 102 to multiplexers 119a–119d, respectively, on DATXSEL signal lines 139a–139d will control the output of each multiplexers 119a–119d as follows: (1) if any time-out detect signal line 109a–109d is asserted, then the output of the DATXSEL signal from the state machine 102 will cause the multiplexer 119a–119d associated with each asserted time-out detect signal line 109a–109d to output "FF"h; (2) if any inactive detect signal 111a–111d is asserted, then the output of the DATXSEL signal will cause the multiplexer 119a–119d associated with each asserted inactive detect signal line 109a–109d to output "FF"h; (3) if both the time-out detect signal and the inactive detect signal associated with one timer are deasserted, then the output from the decrementer 113a–113d is output by the associated multiplexer 119a–119d. The value output from each multiplexer 119a–119d is loaded into the first level output register 121 on the positive edge of the MS clock that occurs during READ2 state 503. The MS clock is coupled on a clock signal line 120 to each output register 121, 123, 125, 127. By outputting a value of "FF"h when a timer has expired, the state machine 102 resets the timer to an inactive state.

In addition, if any of the timers are expired (i.e., any one or more of the time-out detect signals 119a–119d are asserted), then state machine 102 will load the base address of the word containing the expired timer value (as determined by the ACNT register) into the TOXRI FIFO register by asserting a WRTOF signal output from the state machine 102 and coupled to the input of the TOXRI FIFO register. The TOXRI FIFO register is also loaded with four bits, each of which represent whether a particular timer within the word has expired. For example, assume a word is read from the timer array 200 at address (i.e., XRI value) "0 0000 1010" (note that a nine bit XRI value allows each of 512 words to be addressed). That word is loaded into the input register 103. If only the second timer within that word had expired, then the TOXRI FIFO register would be loaded with the XRI value "0 0000 1010" in bits 0–8 of the TOXRI FIFO register and the value "0100" in bits 9–12. Bits 9–12 indicate that the only second timer had expired. If both the first and second timer had both expired, then the value in the first nine bits would remain the same, but the value in bits 9–12 would be "1100".

However, if the TOFULL signal is asserted in READ2 state 503, then the DATXSEL output signals will control the output of each multiplexers 119a–119d as follows: (1) if any time-out detect signal line 109 is asserted, then the output of the DATXSEL signal will cause the multiplexer 119a–119d associated with each asserted time-out detect signal line 109a–109d to output "00"; (2) if any inactive detect signal 111a–111d is asserted, then the output of the DATXSEL signal will cause the multiplexer 119a–119d associated with each asserted inactive detect signal line 109a–109d to output "FF"h; (3) if both the time-out detect signal and the inactive detect signal associated with one timer are deasserted, then the output from the decrementer is output from the associated multiplexer 119a–119d. The outputs from the multiplexers 119a–119d are coupled to and loaded into the first level output register 121 upon the next positive edge of the MS clock signal on the clock signal line 120. By causing the multiplexer 119a–119d to output a value of "00" when a timer has expired and the TOFULL signal is asserted, the present invention ensures that a relatively small number of timed-out timers are communicated to an external processor (such as a protocol processor) within a period of time. That is, only the first 16 timers (in an embodiment in which the TOXRI FIFO is four words deep) in order within the timer array 200 that have expired will be recognized. By loading a value of "00" back into the timer array 200 for each additional timer, the fact that additional timers have also expired will be saved until the next scan interval (unless another 16 timers read from the timer array 200 before the additional timers time out at the next scan interval). By the end of READ2 state 503, the second word will have been received in the input register 103, and the new values for the first word will have been loaded into the first level output register 121. The outputs from the inactive detect and time-out detect circuits 106, 105 associated with the second word are coupled to the state machine. Also, by the end of the READ2 state 503, the contents of the input register 103 is coupled to the inputs to each decrementer 113a–113d.

The state machine 102 then enters READ3 state 505. READ3 state 505 is essentially identical to READ2 state 503. If the TOXRI FIFO register is not full, then the DATXSEL outputs will control the output of each multiplexers 119a–119d as follows: (1) if any time-out detect signal line 109 (associated with the second word) is asserted, then the output of the DATXSEL signal will cause the multiplexer 119a–119d associated with each asserted time-out detect signal line 109a–109d to output "FF"; (2) if any inactive detect signal 111a–111d (associated with the second word) is asserted, then the output of the DATXSEL signal will cause the multiplexer 119a–119d associated with each asserted inactive detect signal line 109a–109d to output "FF"h; (3) if both the time-out detect signal and the inactive detect signal associated with one timer (of the second word) are deasserted (i.e., the timer is active), then the output from the decrementer 113a–113d associated with each active timer is output from the associated multiplexer 119a–119d.

In addition, if any of the timers in the second word are expired (i.e., any one or more of the time-out detect signals 119a–119d are asserted), then state machine 102 will load the base address of the word (as determined by the ACNT register) into the TOXRI FIFO register by asserting the WRTOF signal output from the state machine 102 and coupled to the input of the TOXRI FIFO register. Bits 9–12 of the TOXRI FIFO register are also loaded with four bits, which represent whether each timer within the word has expired.

If the TOFULL signal is asserted, then the DATXSEL output signals will control the output of each multiplexers 119a–119d as follows: (1) if any time-out detect signal line 109 is asserted, then the output of the DATXSEL signal will cause the multiplexer 119a–119d associated with each asserted time-out detect signal line 109a–109d to output "00"; (2) if any inactive detect signal 111a–111d is asserted, then the output of the DATXSEL signal will cause the multiplexer 119a–119d associated with each asserted inactive detect signal line 109a–109d to output "FF"h; (3) if both the time-out detect signal and the inactive detect signal associated with one timer are deasserted, then the output from the decrementer is output from the associated multiplexer 119a–119d. Therefore, if the TOXRI FIFO register is full, then each DATXSEL signal associated with an expired timer causes the multiplexer 119a–119d to output "00".

On the positive edge of the next MS clock, the state machine 102 enters READ4 state 507 and loads the third word (i.e., the third four timers) returned by the DMA controller 137 into the input register 103. The value stored in the ACNT register is incremented to point to the next word and the state machine 102 enables the ACNT register to increment again on the next positive edge of the MS clock. Also, the output from the first level output register 121 is loaded into the second level output register 123 on the positive edge of the MS clock signal on clock signal line 120. Concurrently, the output from each multiplexer 119a–119d is loaded into the first level output register 121. READ4 state 507 is identical to READ3 state 505, except that a request to perform a DMA write is requested. Also, if the enable bit of the ARMCMD register is not asserted, then the state machine 102 returns to IDLE state 401.

If the enable bit of the ARMCMD register is asserted, then the state machine 102 then enters WAITWR1 state 407 (see FIG. 4). The first, second and third level output registers 121, 123, 125 are loaded with the new values to be stored back in the timer array 200. In addition, the base addresses and offset bits of the TOXRI FIFO register are written for each of the first three words that included at least one expired timer. In WAITWR1 state 407, the state machine 102 controls the multiplexers 119a–119d based upon the latched output of the inactive detect and time-out detect circuits 106, 105 using the same logic as used in READ2, READ3, and READ4 states 503, 505, 507.

Accordingly, the values to be written back to the fourth word of the timer array 200 will be loaded into the first level output register 121, and each of the other values are shifted one output register down. When an acknowledge signal is returned to the state machine 102 in response to the request for a DMA write, the state machine 102 enters WRITE state 409 on the next positive edge of the MS clock, and requests a next DMA write. The state machine 102 continues to request DMA writes until the contents of all four of the output registers 121, 123, 125, 127 have been written back to the timer array 200. If the TOEMPTY signal is not asserted, then the state machine 102 increments the TOFIFOCTR register. If the ACNTR is not equal to the MAXXRI value, then the scan is not complete and the ACNT is incremented on the next positive MS clock edge.

If the enable bit of the ARMCMD register is deasserted, then the state machine returns to IDLE state 401. If the enable bit of the ARMCMD register is asserted, and there is a pending CMD in the EDRXCMD register, then the state machine enters RXCMD1 state 411. RXCMD1 state 411 will be described below.

If (1) the enable bit of the ARMCMD register is asserted, (2) there is not pending command in the EDRXCMD register, and (3) a there is a pending command in the ARMCMD register, then the state machine enters ARMCMD1 state 413. ARMCMD1 state 413 will be described below.

If (1) the enable bit of the ARMCMD register is asserted, (2) there is no pending command in the EDRXCMD register, (3) there is no pending command in the ARMCMD register, and (4) there is a pending command in the EDTXCMD, then the state machine enters TXCMD1 state 415. TXCMD1 state 415 will be described below.

If (1) the enable bit of the ARMCMD register is asserted, (2) there are no pending commands in any of the command registers, and (3) the scan has been not completed, then the state machine returns to WAITRD state 403.

If there are no pending commands in any of the command registers and the scan has been completed, then the state machine returns to IDLE state 401.

In RXCMD state 411, the state machine requests a single word DMA read of the DMA controller 137 from the location specified by the XRI field of the EDRXCMD register and the EBPTR register. The result of the DMA request is loaded into the input register 103 of the decrementer circuit 101. The state machine 102 then deasserts the PLSEL signal on the PLSEL signal line 135 to cause the output of the load multiplexer 131 to be available to be written to the timer array 200. The output of the load multiplexer 131 is controlled by the ISEL signal 133. The ISEL signal 133 is a 3-bit control signal that selects one of two inputs to be coupled to one of four timers (i.e., eight bits out of 32). Accordingly, the value in the XRI field 341 of the EDRXCMD register (in particular, in the preferred embodiment of the present invention, the least significant two bits of the XRI field 341) and the value in the CMD field 339 will determine the state of the three ISEL lines 133. Either "FF"h (in the case of a stop command) or a start value taken from the EDTOV register (in the case of a start command) will be loaded back into the timer identified by the XRI field 341. The value of each of the other three timers is taken from the values read from the timer array 200 which are multiplexed into the output value by the load multiplexer 129. The state machine 102 then requests a one word DMA write to the timer array 200 at the location of the timer to be either started or stopped. Upon completion of the DMA write, if the scan bit is set, then the state machine 102 enters WAITRD state 403. If the scan bit is not set, then the state machine 102 returns to IDLE state 401.

The state machine 102 operates essentially the same in both the ARMCMD and TXCMD states 413, 415. The only difference is the source XRI field 341 and the source CMD field 339.

It can be seen from the above description of the preferred embodiment of the present invention that a relatively large quantity of EDTOV timers can be managed with very little processor overhead and very little hardware overhead. The present invention therefore combines the benefits of a hardware timer and the benefits of a software timer together in a single pipelined timer arrangement. Accordingly, the present invention provides a simple, fast and inexpensive solution to situation in which a large number of timers must be maintained without substantially increasing the processor overhead or the hardware overhead. Therefore, the present invention is ideal for timing EDTOV events in a communications link such as the well known Fibre Channel Communications Protocol.

A number of embodiments of the present invention have been described. Nevertheless, it will be understood that various modifications may be made without departing from the spirit and scope of the invention. For example, DMA reads from the timer array 200 may be of any length. The length of the DMA request will preferably determine the number of output registers required. Furthermore, the timer array 200 may be stored in any memory accessible to the DMA controller 137. Also, the values used to represent inactive and expired conditions of a timer are selected for convenience and may be any value. Still further, while it is preferable to decrement each active timer value by one each scan interval, timer values may be decremented by any value. Also, timer values may be incremented in an alternative embodiment of the present invention. Still further, the length of a word and the length of a timer value are selected for convenience. Other lengths may be used in alternative embodiments of the present invention. Also, the particular state machine register disclosed are optional and may be configured in any manner, or may be hardwired values used by the state machine. For example, the CMD field of the EDRXCMD register may comprise the 11th and 12th bit. The SI register may be replaced with a hardwired value. Numerous other variations are possible. Accordingly, it is to be understood that the invention is not to be limited by the specific illustrated embodiment, but only by the scope of the appended claims.

We claim:

1. A timer manager for managing a plurality of timers having timer values stored within a timer array, including:
   (a) a decrementer circuit, having an input port and an output port, for receiving at the input port an input word comprising at lease one timer value, if a timer value is not either an idle value or an expiration value, then decrementing the received timer value, and providing the decremented value at the output port;
   (b) a control device, coupled to the decrementer circuit and to the timer array, for requesting DMA transfers of timer values from the timer array, and loading timer values into the decrementer circuit through the input port, and storing the timer values output from the decrementer circuit in the timer array.

2. The timer manger of claim 1, wherein the decrementer circuit further includes;
   (a) a zero detector for determining when a timer value is equal to an expiration value; and
   (b) a FIFO, coupled to the decrementer circuit, for storing values which indicate which timer values are equal to an expired value;

wherein values are stored in the FIFO only if the FIFO is not full and wherein the value loaded by the decrementer into the timer array is equal to the expiration value if the FIFO is full when the value is decremented and is equal to the idle value if the FIFO is not full when the value is decremented.

3. The timer manager of claim 1, wherein the control device is a state machine.

4. The timer manager of claim 1, wherein up to 2,048 timers may be managed, each with a resolution of as short as approximately 1 μs.

5. The timer manager of claim 4, wherein a MAXXRI register coupled to the control device indicates how many of the words stored in the timer array are to be actively managed.

6. The timer manager of claim 1, wherein the decrementer circuit includes:
   (a) a time-out detect circuit having an output coupled to the control device, for outputting time-out detect signals to the control device, each of which indicate whether a timer value received in the input port is equal to a time-out value;
   (b) a first multiplexer circuit having a first input, a second input, an output, and a control input, the first input being coupled to the input port, the second input being coupled to a time-out value, the output being coupled to the output port, and the control input being coupled to the control device, for receiving the input word and outputting an output word comprising the same number of timers as the input word input, each timer value of the output word being associated with one of the timer values of the input word, and the timer value of the output word being selectable by the control device, the output timer value being selected from among:
   (1) the associated timer value of the input word; or
   (2) a time-out value.

7. The timer manager of claim 6, wherein the first multiplexer has a third input coupled to an inactive value, and the control device may also select a timer value of the output word to be equal to the inactive value.

8. The timer manager of claim 7, wherein the input port is an input register.

9. The timer manager of claim 8, wherein the decrementer circuit further includes at least one output register, coupled between the first multiplexer and the second multiplexer, for storing words output from the first multiplexer, each of the words being output to the second multiplexer from the at least one output register in the order each word is input to the at least one output register.

10. The timer manager of claim 9, further including at least one command register, coupled to the control device, for commanding the control device to start a timer, the command register being accessible to an external control processor.

11. The timer manager of claim 7, further including a TOFIFO register configured as a first-in, first-out register for logging which timer values have caused a time-out signal to be asserted by the time-out detector.

12. The timer manager of claim 11, wherein the output port is a second multiplexer having a first input coupled to a load value, and a second input coupled to the output of the first multiplexer.

13. The timer manager of claim 12, wherein the third multiplexer has a third input coupled to an inactive value, such that the control device can couple the inactive value to the output port through the third and the second multiplexers.

14. The timer manager of claim 12, wherein a EDTOV register coupled to the second input to the third multiplexer indicates the start value.

15. The timer manager of claim 14, wherein the control device can request that the number of words read in the DMA either be equal to one, or equal to the number of output registers in the decrementer circuit.

16. The timer manager of claim 7, wherein the control device causes the first multiplexer to select a timer value of the output word to be equal to the inactive value when the fact that the time-out detector output signal associated input word timer value has been asserted will be logged.

17. The timer manager of claim 16, wherein the decrementer circuit further includes:

(a) an inactive detector circuit, coupled to the input register for outputting inactive detect signals to the control device, each of which indicate whether a timer value received in the input port is equal to an inactive value;

wherein the output timer value may also be selected to be an inactive value and the control device controls the output of the first multiplexer based upon the outputs from the time-out detector and inactive detector circuits.

18. The timer manager of claim 17, wherein:

(a) the output port is a second multiplexer having an output, a first input, a second input, and a select line coupled to the control device for selecting whether the first input or the second input is to be coupled to the output;

(b) the decrementer has a third multiplexer having an output, a first input, a second input, and a select line coupled to the control device for selecting whether the first input or the second input is to be coupled to the output;

(c) the first input of the second multiplexer being coupled to the output of the third multiplexer;

(d) the second input to the second multiplexer is coupled to the output of the first multiplexer;

(e) the first input to the third multiplexer is coupled to the output of the input register;

(f) the second input to the third multiplexer is coupled to a start value; and (g) the control device causes the select lines of the second and third multiplexers to cause the decrementer circuit to output a word in which a selected timer value is equal to the start value when the control device is commanded to start a timer.

19. The timer manager of claim 18, wherein the state machine is coupled to an external DMA controller for requesting that the DMA controller perform a DMA read operation from the timer array and load the value read from the timer array into the decrementer input register.

* * * * *